United States Patent
Pham

(10) Patent No.: US 11,979,208 B1
(45) Date of Patent: May 7, 2024

(54) MULTI-GATEWAY MULTI-BEAM SATELLITE COMMUNICATION SYSTEM WITH PRECODING FEEDBACK CONTROLLERS

(71) Applicant: Govt of the US as rep by the Sec of the Air Force, Wright Patterson AFB, OH (US)

(72) Inventor: Khanh Pham, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 177 days.

(21) Appl. No.: 17/834,247

(22) Filed: Jun. 7, 2022

Related U.S. Application Data

(63) Continuation-in-part of application No. 17/653,346, filed on Mar. 3, 2022.

(60) Provisional application No. 63/158,188, filed on Mar. 8, 2021, provisional application No. 63/158,213, filed on Mar. 8, 2021.

(51) Int. Cl.
| | |
|---|---|
| *H04B 7/185* | (2006.01) |
| *H04B 7/0456* | (2017.01) |
| *H04B 7/06* | (2006.01) |
| *H04B 17/336* | (2015.01) |
| *H04W 88/16* | (2009.01) |

(52) U.S. Cl.
CPC ......... *H04B 7/0456* (2013.01); *H04B 7/0639* (2013.01); *H04B 7/18513* (2013.01); *H04B 17/336* (2015.01); *H04W 88/16* (2013.01)

(58) Field of Classification Search
CPC H04B 7/0456; H04B 7/0639; H04B 7/18513; H04B 17/336; H04W 88/16
See application file for complete search history.

(56) References Cited

U.S. PATENT DOCUMENTS

| | | |
|---|---|---|
| 7,949,318 B2 | 4/2011 | Prasad |
| 8,140,070 B2 | 3/2012 | Ashikhmin |

(Continued)

OTHER PUBLICATIONS

K. Tian, G. Chen, K. D. Pham, and E. Blasch, "Joint Transmission Power Control in Transponded SATCOM Systems," IEEE Military Communications Conference, DOI: 10.1109/MILCOM.2016.7795313, Baltimore, MD, 2016.

(Continued)

*Primary Examiner* — Janice N Tieu
(74) *Attorney, Agent, or Firm* — AFMCLO/JAZ; Larry L. Huston

(57) ABSTRACT

A multi-gateway multi-beam satellite communication system. The system has a satellite a plurality of gateways for providing broadband services to users and being in bilateral communication with the satellite by a like plurality of feeder links and a second plurality of clusters of coverage areas in bilateral communication with the satellite by a like plurality of service links. The system has a precoder for allocating power to either or both of the feeder links and service links. Precoding can be based on signal to noise plus interference ratio or interference temperature. Precoding can be based on discrete-time dynamical feedback system frameworks with real-time feedback signaling comprised of signal-to-noise plus interference ratio, signal-to-leakage-plus-noise ratio, interference temperatures and/or tracking errors.

20 Claims, 6 Drawing Sheets

(56) References Cited

U.S. PATENT DOCUMENTS

| | | | |
|---|---|---|---|
| 9,743,362 B1 | 8/2017 | Tian | |
| 9,991,587 B1 | 6/2018 | Freedman | |
| 11,542,040 B1 * | 1/2023 | Hemmati | B64G 3/00 |
| 2008/0165875 A1 | 7/2008 | Mundarath | |
| 2010/0091678 A1 | 4/2010 | Chen | |
| 2010/0303002 A1 | 12/2010 | Zorba Barah | |
| 2017/0288769 A1 | 10/2017 | Miller | |
| 2018/0152230 A1 | 5/2018 | Khojastepour | |
| 2018/0152231 A1 | 5/2018 | Jeong | |
| 2022/0052754 A1 * | 2/2022 | Dutta | H04B 7/18515 |
| 2023/0231620 A1 * | 7/2023 | Li | H04B 7/18541 |
| | | | 370/252 |

OTHER PUBLICATIONS

Pham KD. "Power allocation for shared transponders: A statistical optimal control paradigm." In2018 IEEE Aerospace Conference Mar. 3, 2018 (pp. 1-10). IEEE.

K. D. Pham, "Assured Satellite Communications: A Minimal-Cost-Variance System Controller Paradigm," American Control Conference, pp. 6555-6561, DOI: 10.1109/ACC.2016.7526702, Boston, MA, 2016.

K. D. Pham, "Minimal-Variance-Cost Power Control for Differentiated Services Satellite Communications," IEEE Aerospace Conference, pp. 1-8, DOI:10.1109/AERO.2016.7500831, Big Sky, MT, 2016.

K. D. Pham, "Minimal Variance Control of Clock Signals," IEEE Aerospace Conference, pp. 1-8, DOI:10.1109/AERO.2016.7500498, Big Sky, MT, 2016.

L. Cosenza, M. K. Sain, R. W. Diersing, and C.-H. Won, "Cumulant control systems: the cost-variance, discrete-time case," Advances in Statistical Control, Algebraic System Theory, and Dynamic System Characteristics, C.-H. Won et al. (eds), Birkhauser Boston, DOI: 10.1007/978-0-8176-4795-7, 2008.

G. Giorgi and C. Narduzzi, "Performance Analysis of Kalman-Filter-Based Clock Synchronization in IEEE 1588 Networks," in IEEE Transactions on Instrumentation and Measurement, vol. 60, No. 8, pp. 2902-2909, Aug. 2011, doi: 10.1109/TIM.2011.2113120.

K. D. Pham, "Control Engineering for Hybrid Ground and Space Precoding in Multi-Gateway Multi-Beam Satellite," 2021 IEEE Aerospace Conference (50100), 2021, pp. 1-9, doi: 10.1109/AERO50100.2021.9438378.

K. D. Pham, "Risk-Sensitive Rate Correcting for Dynamic Heterogeneous Networks: Autonomy and Resilience," 2020 IEEE Aerospace Conference, 2020, pp. 1-10, doi: 10.1109/AERO47225.2020.9172717.

K. D. Pham, "A Control-Theoretic Approach to Precoding for Multi-Cast Multi-Beam over Satellite," 2020 IEEE Aerospace Conference, 2020, pp. 1-11, doi: 10.1109/AERO47225.2020.9172594.

* cited by examiner

MULTI-GATEWAY MULTI-BEAM SATELLITE COMMUNICATION SYSTEM WITH PRECODING FEEDBACK CONTROLLERS

CROSS REFERENCE TO RELATED APPLICATIONS

This application claims priority to and the benefit of U.S. application Ser. No. 17/653,346 filed Mar. 3, 2022 the disclosure of which is incorporated herein by reference, and, claims priority to U.S. Provisional Application No. 63/158,188, filed Mar. 8, 2021, the disclosure of which is incorporated herein by reference and claims priority to and the benefit U.S. Provisional Application No. 63/158,213, filed Mar. 8, 2021, the disclosure of which is incorporated herein by reference.

STATEMENT OF GOVERNMENT INTEREST

The invention described and claimed herein may be manufactured and used by or for the Government of the United States of America for all government purposes without the payment of any royalty.

FIELD OF THE INVENTION

The present invention is related to a multi-gateway multi-beam satellite communication with an adaptive precoding controller system and more particularly to such a system which reduces error between actual and desired signal to interference plus noise ratios.

BACKGROUND OF THE INVENTION

Multi-gateway multi-beam satellite communications (SATCOM) use a plurality of radio beams deployed throughout coverage service areas to accommodate increase demand for higher throughput. Full frequency reuse patterns build on different beams by offering a significant performance improvement in spectral efficiency. However, as adjacent beams suffer from the inherent multi-user interference, the nature of multi-beam interference requires close collaboration with multiple-input-multiple-output communications, particularly multi-user detection and digital precoding (also known as beamforming) in forward and return communication accesses.

Feeder links are used to aggregate satellite traffic. As the number of individual beams increases, the spectral resources associated with the feeder links increases proportionally. Particularly, the required bandwidth of all the feeder links is governed by $BW_{feeder\text{-}links} = N \cdot BW_{user\text{-}link}$, where N is the number of feed signals and $BW_{user\text{-}link}$ denotes the per-beam bandwidth.

Precoding mechanisms have been previously considered to reduce the bandwidth required for feeder links (i.e., gateway-to-satellite communication links) in multi-beam SATCOM. For example, distributed hybrid ground-space precoding, sometimes in combination with independent data traffic generation and minimal signal exchanges among gateways, has been attempted. In such prior attempts, each gateway must adjust its own precoding matrix, in order to satisfy both per-feed power constraints and quality of service (QoS) constraints of data transmission. But current precoding attempts may incur large path losses and operate at low signal-to-noise ratios in multi-beam SATCOM systems.

Furthermore, when sufficient feeder link receivers are available at the satellite, the feed signals transmitted by distributed gateways are often demultiplexed and routed through the array fed reflector antenna. Although directive antennas are commonly used by ground users within each beam, pointing errors and hardware calibration errors do occur. Such errors can lead to inter-feeder link interference. Thus, it is difficult for on ground beamforming and precoding to suppress inter-feeder link interferences by linearly processing the symbols before being transmitted.

SUMMARY OF THE INVENTION

In one embodiment the invention comprises a multi-gateway multi-beam satellite communication system. The system comprises a satellite having an array fed reflector antenna with a plurality of N elements, a first plurality of G gateways for providing broadband services to users and being in bilateral communication with the satellite by a like plurality of G feeder links, a second plurality of K clusters of coverage areas in bilateral communication with the satellite by a like plurality K of service links, wherein N>K, a precoding controller for comparing an actual SINR to a desired SINR setpoint, and comparing a signal power at a g-th cluster to a set of powers leaked from neighboring clusters of coverage areas. In a first embodiment the precoding controller is on ground at the gateways. In a second embodiment the precoding controller is onboard the satellite.

DETAILED DESCRIPTION OF THE INVENTION

Figure 1:
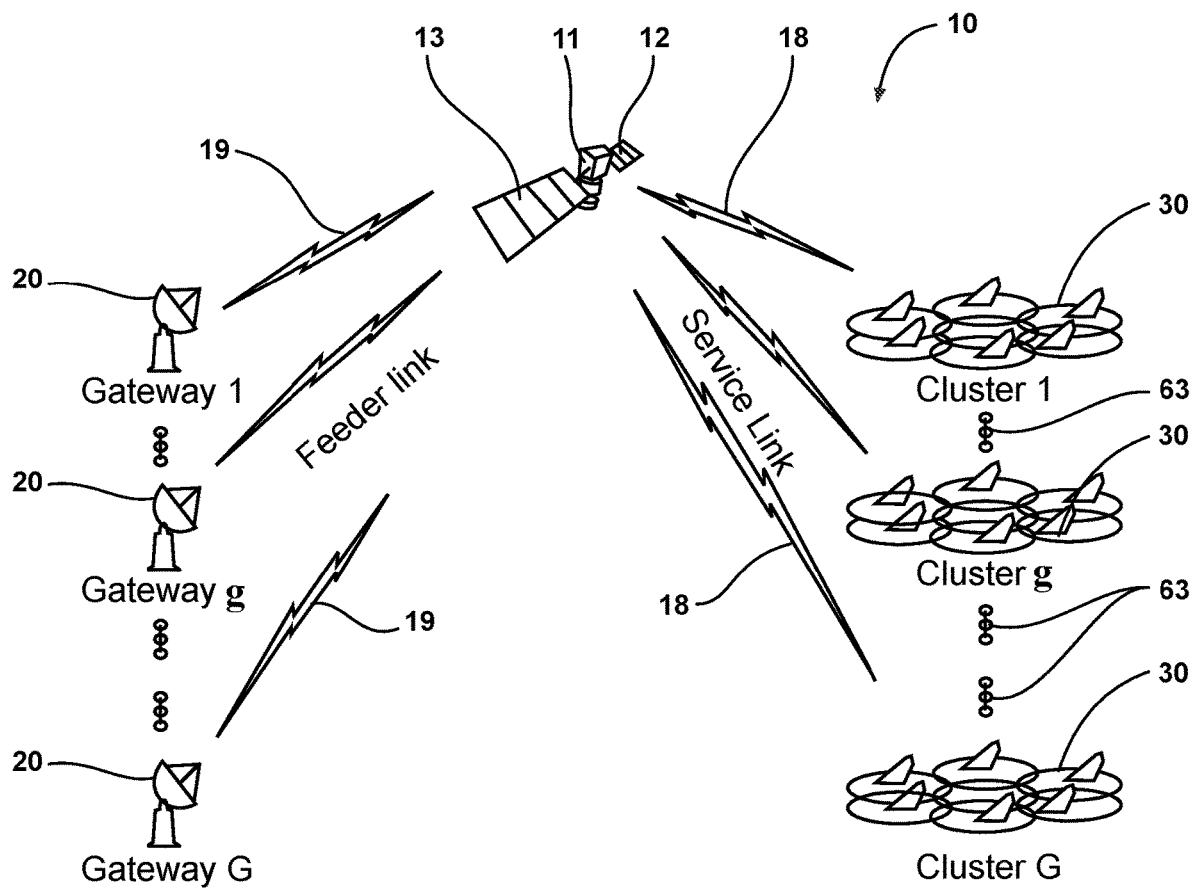
FIG. 1 is a schematic illustration of a multi-gateway, multi-beam SATCOM system.

Referring to FIG. 1, a multi-beam SATCOM system 10 is defined as two-way communication system 10 by utilizing a geosynchronous satellite 11, feeder links 19 (between gateways 20 and the satellite 11), service links 18 (between the satellite 11 and coverage areas) and gateways 20 (which provide broadband services to a large set of remote users). Multi-beam implementation allocates frequency resources by dividing a single wide frequency band into plural narrow frequency bands. But multi-beam implementation causes a regular reuse of the frequency resources to increase system 10 capacity. In multi-beam implementation each carrier frequency is characterized by a narrow beam or spot beam and is considered to be a common channel shared among various users within each spot beam. As used herein, the suffixes OG and OB mean on ground at the gateway 20 and onboard the satellite 11, respectively.

Generally, the users are substantially uniformly distributed within each spot beam. The coverage area is blanketed by a total integer number of K spot beams and is further simultaneously served by a finite integer number of G, gateways 20. Each gateway 20 serves a set of adjacent feeder links 19. The satellite 11 may be equipped with an array fed reflector antenna 12, with an integer number of N elements 13, where the practical understanding is N>K. There are G feeder link 19 receivers at the satellite 11, each of which is associated with a unique gateway 20. In order to use the same frequency, each user with a single antenna 12 that is active in each spot beam at each given time slot, can adopt Time Division Multiplexing (TDM) multiple access.

It is assumed that complex valued data transmitted from distributed gateways 20 are independent and identically distributed (i.i.d.) random variables with uniform distributions and have unit variances. The corresponding received signals for K users during a time slot is given by:

$$y = Hx + n \quad \text{(Eq. 1)}$$

where $y \in C^{K \times 1}$ is a vector that contains the symbols received by each user per beam x;
$x \in C^{N \times 1}$ is the vector of the transmitted signals by all gateways 20 at all feeds; and
$n \in C^{K \times N}$ contains the stack of zero-mean additive white Gaussian noise, such that $E\{nn^H\} = \sigma^2_n I_{K \times K}$.

Concentration is derived from onboard beamforming, which is performed to efficiently reduce intercluster interferences 63. Specifically, the on-board beamforming matrix:

$$F_{OB} \in C^{N \times N} \quad \text{(Eq. 2)}$$

is based on the entire array of signals to ensure sufficient degrees of freedom are present to accommodate the precoding described herein.

Similarly, transmit the transmit data from the gateway 20 can be written as:

$$X = F_{OG} s \quad \text{(Eq. 3)}$$

where $s \in C^{K \times 1}$ is the transmit symbol vector such that the k-th entry of s is the constellation symbol destined to the k-th user with $E\{ss^H\} = I_{K \times K}$, whereas $F_{OG} \in C^{N \times K}$ denotes the block linear precoding matrix 51.

For the embodiments described and claimed herein, $F_{OG}$ is computed locally at each gateway 20 and distributed in blocks in feeder link 19 transmissions, whereby each feed signal is generated by a single gateway 20 to prevent signal overlapping.

Each gateway 20 is capable of implementing a precoding matrix 51 $F^{(g)}_{OG} \in C^{N_g \times K_g}$ and $g=1, \ldots, G$ to serve $K_g$ users with $N_g$ feeds, where $N_g$ determines the number of total streams transmitted in the feed link from the g-th gateway 20 and $K_g \leq N_g$, for $g=1, \ldots, G$. The streams are transmitted in a frequency multiplexed implementation 64 in the feeder link 19 such that the required bandwidth is directly proportional to $N_g$.

The overall channel model with element $(H)_{ij}$ 13 of the total user link channel $H \in C^{K \times N}$ denotes the gain of the link between the i-th user per the i-th beam and the j-th satellite 11 feed. The total user link channel matrix H reveals some abstractions of atmospheric fading, feed radiation pattern, and on-board beamforming is given by:

$$H = D \cdot B \cdot F_{OB} \quad \text{(Eq. 4)}$$

where the diagonal matrix $D \in C^{K \times K}$ takes into account the atmospheric fading in the user link as:
$D = \text{diag}((1/\sqrt{A_1}, \ldots, 1/\sqrt{A_K})$ and $A_k$ for $k=1, \ldots, K$ is the rain attenuation affecting the kth beam and the path loss matrix is given by:

$$b_{kn} = \{W_{Rgkn}\}/\{(4\pi/d_k\lambda)(\sqrt{k_B T_R BW})\} \quad \text{(Eq. 4A)}$$

where $W^2_R$ denotes power gain of the user receiver. The radiation pattern from the n-th feed element 13 to the k-th user is denoted by $g_{kn}$ such that the respective feed transmit gain is $10 \log_{10}|g_{kn}|^2$. The distance between the k-th user and the satellite 11 is $d_k$. The carrier wavelength is $\lambda$ and $k_B$ stands for the Boltzmann constant. $T_R$ is the receiver noise temperature and BW is the carrier bandwidth. Concentration is also derived from on-board beamforming, which is performed to efficiently reduce intercluster interferences 63. Specifically, the on-board beamforming matrix, $F_{OB} \in C^{N \times N}$ is based on the whole array to ensure sufficient degrees of freedom.

Figure 2:
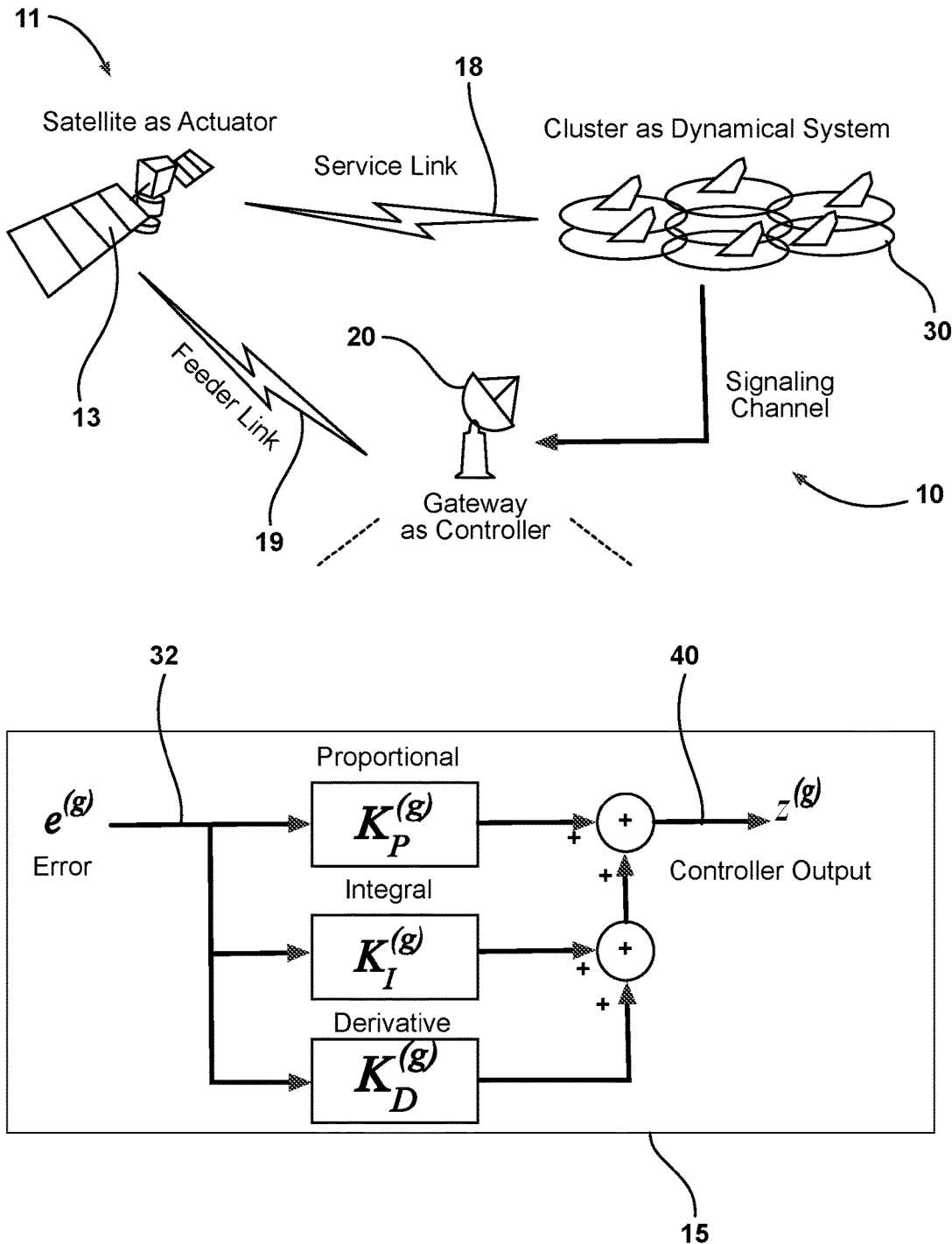
FIG. 2 is a schematic illustration of a control system for onground precoding of distributed PID controllers in multi-gateway precoding.
Figure 5:
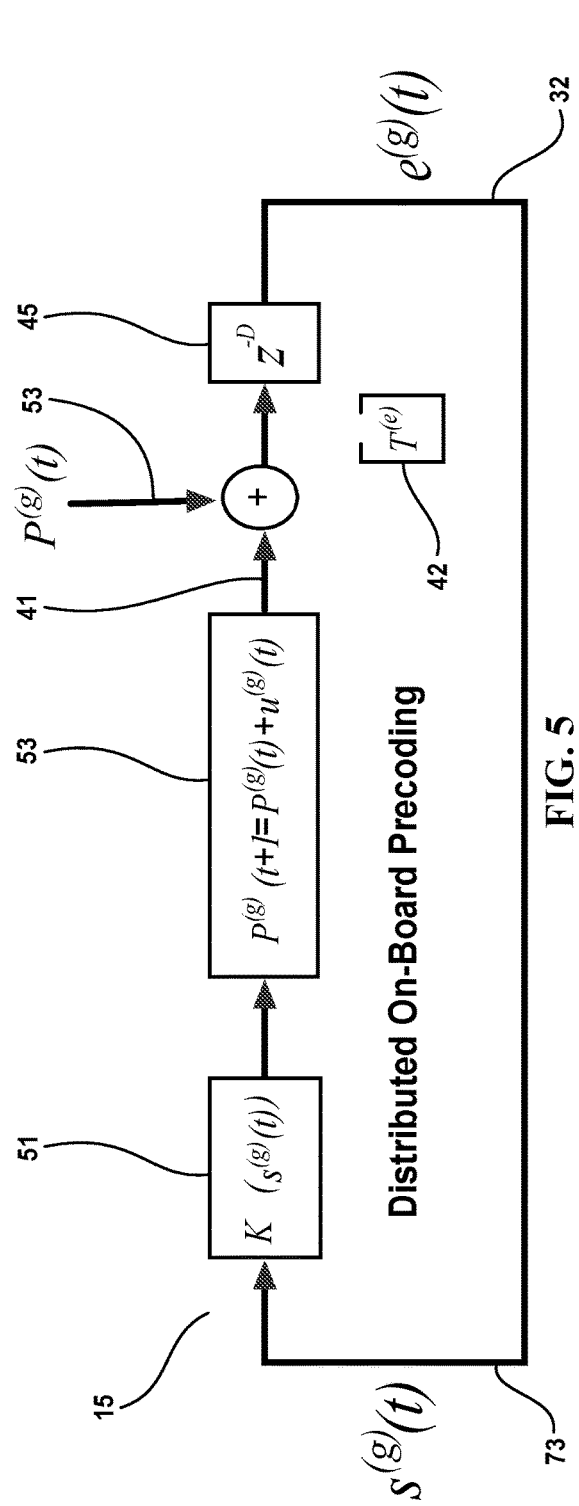
FIG. 5 is a schematic illustration of a feedback loop for onboard precoding.

Referring to FIG. 2 and FIG. 5, in a first embodiment multi-gateway 20 precoding is performed on ground by a precoding controller 15. On ground precoding at each gateway 20 involves two separate processes: i) an observation process via feedback signaling of interference temperatures 41 and maximal interference power tolerances 42 and ii) a decision process of transmission power for feeder links 19, optionally based on PID control 58 method. The precoding utilizes dynamic feedback of interference temperatures 41 and tolerance measurements to meet the progression of QoS constraints for data transmission and to mitigate intercluster interference 63. Interference temperatures 41 and maximum interference power tolerances 42 from correspondent clusters 30 are assumed to be periodic through the return service links 18 during Signal-to-interference-plus-noise (SINR) 44 feedback.

In the first embodiment propagation phenomena and impairments that occur in the physical channel of multi-beam SATCOM systems 10 are characterized as:

$$H = D \cdot B \cdot F_{OB} = \tilde{H} \cdot F_{OB} \quad \text{(Eq. 5)}$$

where the channel matrix $H \in C^{K \times N}$ of the case of multi-gateway 20 multi-beam SATCOM system 10 represents: i) diagonal sub-matrices that denote the channel effects of the feed signals assigned to certain gateways 20 together with the incumbent users and ii) off-diagonal sub-matrices that characterize the impact of the feed signals to the unintended gateways 20 and users. A significant challenge in multi-gateway 20 precoding arises from the fact that channel estimation is required to determine the coefficients of the channel matrix H. If so, inter-gateway 20 communications in support of cooperation among gateways 20 may then be expensive in terms of size, weight, power and cost of the gateway modules.

The actual SINR 44 at g-th cluster 30 provides a framework for adjusting $F^{(g)}_{OG}$ to meet the quality of service (QoS) constraints of data transmission where at epoch t, $\|H^{(g)}_g(t)F^{(g)}_{OG}(t)\|^2_F$ the signal power at g-th cluster 30 is compared to $\Sigma^G_{i=1, i \neq g} \|H^{(i)}_g(t)F^{(i)}_{OG}(t)\|^2_F$ which characterize the powers leaked from other neighboring clusters 30 and the noise power $K_g \sigma^2_n$ at the g-th cluster 30 and $\|\cdot\|^2_F$ is the Frobenius matrix norm for enclosed matrix variables.

Periodic measurement points available at all the G clusters 30 may be used to determine the effects of interference interactions among the clusters 30 by means of the interference temperature 41, namely $I^{(c)}(t)$ measured at the c-th cluster 30 for $c=1, \ldots, G$ and at epoch t by:

$$I^{(c)}(t) = \Sigma^G_{i=1} \|H^{(i)}_c(t)F^{(i)}_{OG}(t)\|^2_F \quad \text{(Eq. 6)}$$

where the all the terms on the right hand side of Eq. 6 can be measured by iterative multi-user detection, data-aided channel estimation and successive interference cancelation and $H^{(i)}_c$ denotes the channel sub-matrix corresponding to the effect of i feeds to the c-th cluster 30 at epoch t, and $F^{(i)}_{OG}(t)$ denotes the block linear precoding matrix 51 of the g-th cluster 30 at epoch t.

The present invention utilizes the interference temperature 41 determined by Eq. 6 and the maximum interference power tolerances 42, $T^{(c)}$ and $c=1, \ldots, G$ for mitigating the intercluster interferences 63. Thus to avoid intercluster interferences 63, it is preferable to have the interference temperature 41 $I^{(c)}(t)$ less than or equal to the maximum interference power tolerance 42, given by:

$$T^{(c)} \geq I^{(c)}(t) \qquad \text{(Eq. 7)}$$

so that intercluster interferences 63 are minimized at the measurement point for the c-th cluster 30.

Figure 3:
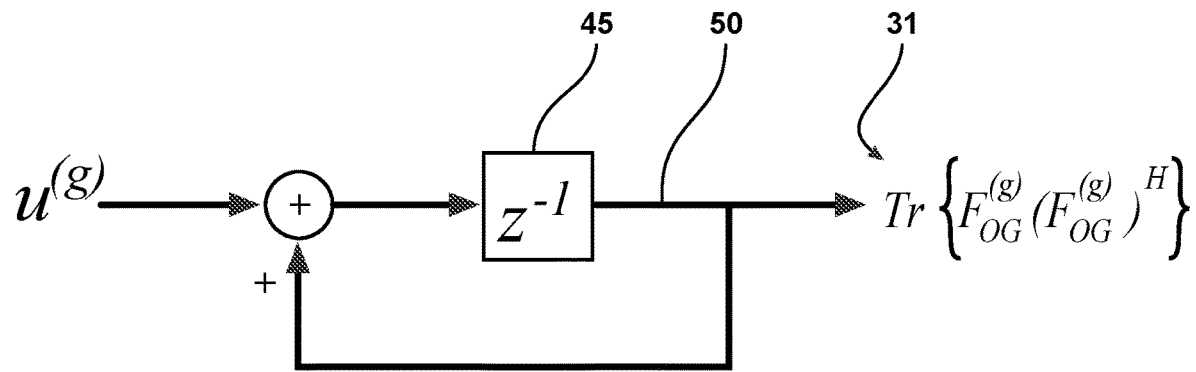
FIG. 3 is a schematic illustration of a control and coordination system for onground multi-gateway precoding.

Referring to FIG. 3, each gateway 20 may adjust its precoding matrix 51, in order to satisfy the respective per-feed power constraints and satisfy its QoS constraints of data transmission, thereby reducing large path losses and low signal-to-noise ratios. Discrete time implementation 50 may be used to determine the difference between the precoding matrix 51 at $F^{(g)}_{OG}(t)$ at epoch t and the precoding matrix 51 at $F^{(g)}_{OG}(t+1)$ at epoch (t+1).

Figure 4:
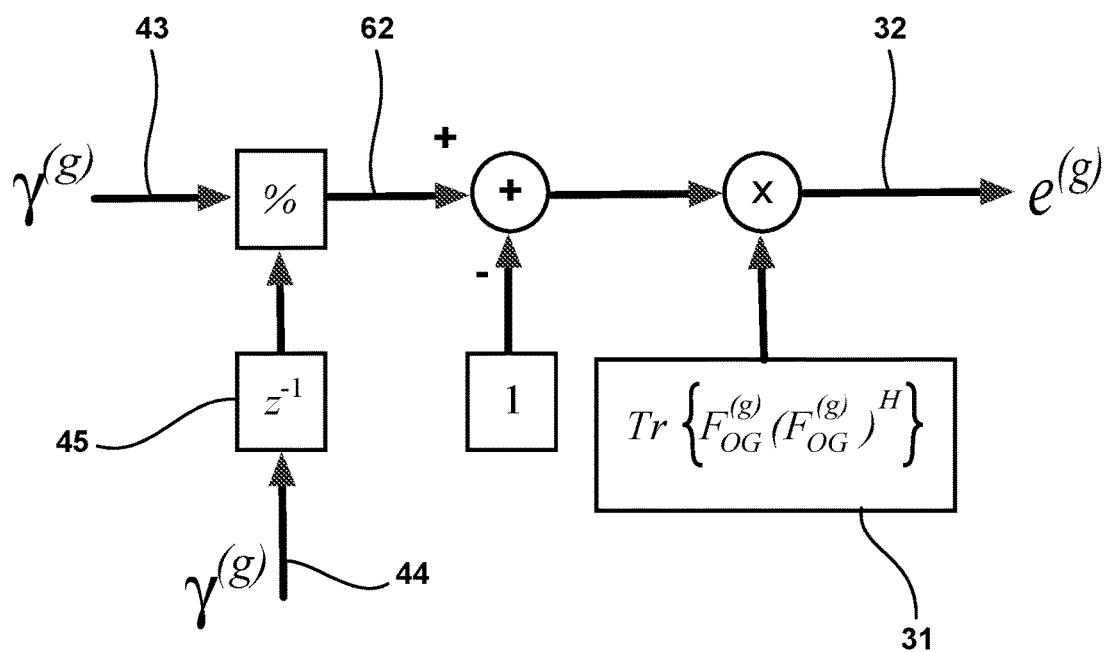
FIG. 4 is a schematic illustration of a control and coordination system determining tracking error in multi-gateway precoding.

Referring to FIG. 4 and FIG. 5, the present invention provides the simplicity of not requiring all information regarding channel gains and precoding matrix 51 information from all gateways 20. Instead the g-th gateway 20 only needs to determine the equivalent tracking error 32 at epoch t−1. The tracking error 32 $e^{(g)}_{OG}$ is the difference between the desired SINR 43 $\Gamma^{(g)}$ and actual SINR 44 $\gamma^{(g)}$.

Referring to FIG. 4 and back to FIG. 2, using PID control 58, the actual increment 45 $z^{(g)}(t)$ at epoch t to push or pull the actual SINR 44 $\gamma^{(g)}$ closer to the desired SINR 43 $\Gamma(g)$ is given by:

$$z^{(g)}(t) = K^{(g)}_P e^{(g)}_{OG}(t-1) + K^{(g)}_I x^{(g)}(t-1) + K^{(g)}_D [e^{(g)}_{OG}(t-1) - e^{(g)}_{OG}(t-2)] \qquad \text{Eq. 8}$$

where $K^{(g)}_P$, $K^{(g)}_I$ and $K^{(g)}_D$ are the degrees of freedom for proportional, integral, and derivative control 58 actions, respectively for the controller output 40.

To mitigate intercluster interferences 63 each gateway 20 may further refine its on ground precoding matrix 51, F (g) OG and $g=1, \ldots, G$ to by explicitly satisfying the constraint of Eq. 7. The g-th gateway 20 monitors the QoS of its own data transmission by measuring:

$$\eta^{(g)}(t) = \Gamma^{(g)}/(\gamma^{(g)}(t-1)). \qquad \text{Eq. 9}$$

If $\eta^{(g)}(t) > 1$, the g-th gateway 20 increases its on ground precoding transmission power so as to increase $\gamma^{(g)}(t)$. Conversely, for $\eta^{(g)}(t) < 1$, the on ground precoding transmission power at the g-th gateway 20 is decreased, thereby, increasing SINR 44 for other gateway 20 transmissions. Provided that $I^{(g)}(t-1)$ is less than $T^{(g)}$, then intercluster interference 63 does not impact the g-th cluster 30 for $g=1, \ldots, G$.

As the g-th gateway 20 increases precoding transmission power, intercluster interference 63 $\Theta(t)$ is unlikely to occur at neighboring clusters 30 if $\Theta(t) \geq 1$ where:

$$\Theta(t) = T_{min}/(I_{max}(t-1)) \text{ and } T_{min} = \min_{g=1,\ldots,G} T^{(g)} \text{ and } I_{max}(t-1) = \max_{g=1,\ldots,G} I^{(g)}(t-1). \qquad \text{Eq. 10}$$

If $\Theta(t) \geq 1$ at gateway 20 g, then the g-th gateway 20 can increase its precoding transmission power from: $Tr\{F^{(g)}_{OG}(t-1) \, F^{(g)}_{OG}{}^H(t-1)\}$ to $\Theta(t) Tr\{F^{(g)}_{OG}(t-1)(F^{(g)}_{OG}{}^H(t-1)\}$ for $g=1, \ldots, G$, without deleterious effects on intercluster interferences 63 with neighboring clusters 30. The technical basis for increasing transmission power at the g-th gateway 20 is that $\Theta(t)$ remains≤equal or $\min_g\{T^{(g)}/(I^{(g)}(t-1))\}$.

A suitable dynamic constraint for transmission power is given by:

$$u^{(g)}_{OG}(t) = \min\{z^{(g)}(t), c^{(g)}(t)\} \qquad \text{Eq. 10A}$$

where $u^{(g)}_{OG}(t)$ is the difference at the g-th gateway 20 transmission between the precoding matrix 51 $F^{(g)}_{OG}(t)$ at epoch t and the precoding matrix 51 $F^{(g)}_{OG}(t+1)$ at epoch t+1, $z^{(g)}(t)$ is the desired increment 33 for the precoding matrix 51 at epoch (t) and $c^{(g)}t$ the dynamic power constraint at epoch (t). The dynamic power constraint $c^{(g)}(t)$ is directly proportional to the desired SINR 43.

The first embodiment of the present invention avoids the necessity of re-optimizing on ground precoders between epochs for performance losses caused by imperfectly calibrated multi-gateway 20 feeder link 19 hardware and to accommodate ideal interference-free feeder link 19 assumption. This first embodiment has the benefit that distributed hybrid ground-space precoding limits channel state information from other gateways 20. Furthermore, each gateway 20 may be assigned a relatively small number of beams to transmit. The simplicity of signal processing and inter-gateway 20 communications in this first embodiment makes provides backhauling cost reduction without sacrificing reliability.

Referring to FIG. 5, in a second embodiment of the present invention the precoding is performed onboard one or more satellites 11. On-board precoding relies upon the responses of both the array fed reflector antenna 12 and the service link 18 channels, employing long-term channel side information. This embodiment considers total interference power $F^{(t)}_{OB}(t)$ for the g-th cluster effects on each of the other clusters 30. This second embodiment is used to minimize the leakage of the power of interference caused by the g-th cluster 30 on the signals received by all other clusters 30 via $H^-_c F^{(g)}_{OB}$ and $c=1, \ldots, g-1, g+1, \ldots, G$ based upon actual Signal-to-Leakage-plus-Noise ratios (SLNRs) 60.

At epoch t, $Tr\{F^{(g)}_{OG}(t)(F^{(g)}_{OG})^H(t)\}$ is the total transmit power 31 of on ground precoding for the g-th cluster 30. The covariance of the of the desired cluster $R^{(g)}t$ 30 is given by:

$$R^{(g)}(t) = (H^-_g)^H(t) H^-_g(t). \qquad \text{Eq. 11}$$

Onboard precoding selects $F^{(t)}_{OB}(t)$ so that the desired SLNR 61 associated with the g-th cluster 30 approaches the setpoint $\pi^{(g)}$ to minimize the tracking error 32 $e^{(g)}_{OB}(t)$, where $e^{(g)}_{OB}(t)$ is given by:

$$e^{(g)}_{OB}(t) = \{1 - \pi^{(g)}/(\pi^{(g)}(t-D))\} \cdot Tr\{(F^{(g)}_{OB})^H(t-D)R^{(g)}(t-D)F^{(g)}_{OB}(t-D)\} \qquad \text{Eq. 12.a}$$

and the reference values are $\pi^{(g)}$ are gradually adjusted for each cluster 30 to achieve an equilibrium state that maximizes the data rates and minimizes intercluster interferences 63 and D denotes the delay, which is a multiplicity of epoch unit times for onboard precoding updates for the downlink service paths.

Referring back to FIG. 3, thus, the tracking error 32 can be given by:

$$e^{(g)}_{OB}(t) = p^{(g)}(t-D) - p^{\wedge(g)}(t-D) \qquad \text{Eq. 12.b}$$

where $p^{(g)}$ is the incremental power update 53 amount for onboard precoding and is given by:

$$p^{(g)}(t+1) = p^{(g)}(t) + u^{(g)}_{OB}(t) \qquad \text{Eq. 13}$$

and $u^{(g)}_{OB}$ is the difference at the g-th gateway 20 transmission between the precoding matrix 51 $F^{(g)}_{OG}(t)$ at epoch t and the precoding matrix 51 $F^{(g)}_{OG}(t+1)$ at epoch t+1.

Figure 6:
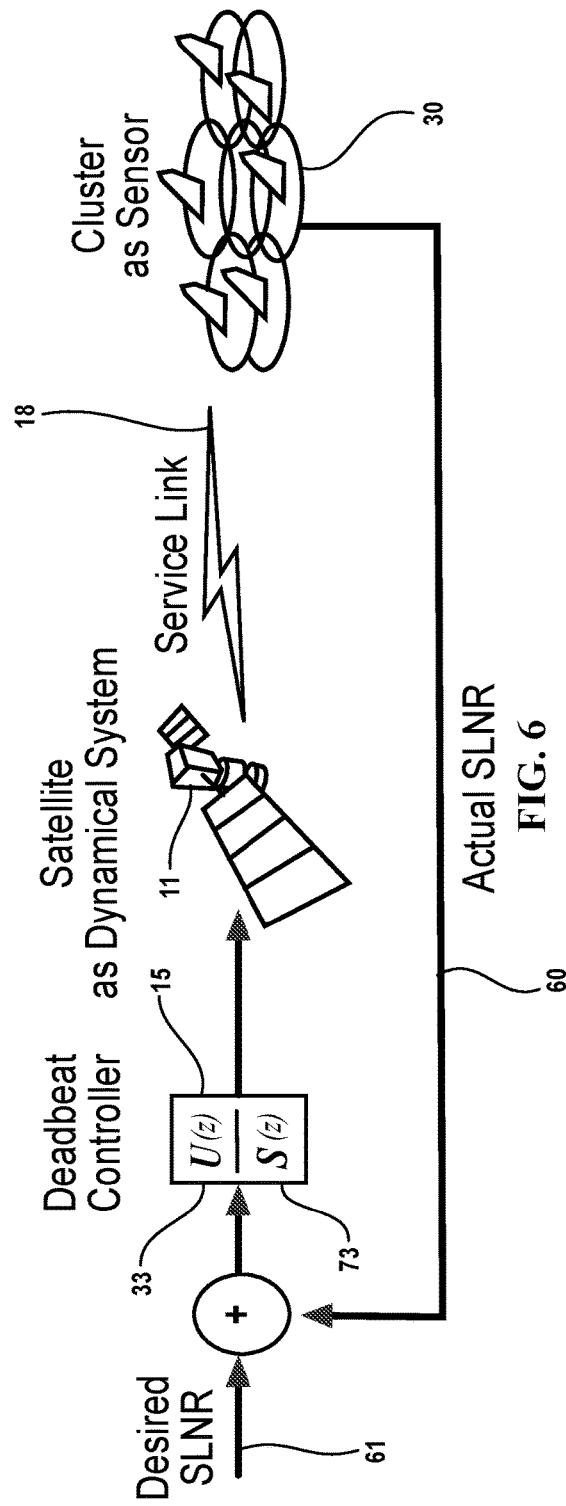
FIG. 6 is a schematic illustration of a control and coordination system for onboard precoding.

Referring to FIG. 6, this embodiment may be used to perform a deadbeat response 71. A deadbeat response 71 is one that reaches the desired reference, namely $\pi^{(g)}$ in the minimum time without error. One benefit of dead-beat control is that, in contrast with the aforementioned PID control 58 paradigm, deadbeat control it does not require tuning during implementation. Deadbeat control feeds the desired SLNR 61 of a predetermined cluster 30 to the corresponding dead-beat controller 15. The onboard precoding exercised by distributed deadbeat control in the beam space as a whole remains to some extent coordinated, since the values of on ground transmission matrices will influence the onboard transmission matrices. The deadbeat controller 15 analyzes the desired power increment 33 as a linear state variable 73. The feedback control policy for the g-th cluster 30 of the deadbeat controller 15 is given by:

$$K^{(g)}_{OB}(z) = -1/(1 + z^{-1} + z^{-2} + \ldots + z^{D-1}) \quad \text{Eq. 14}$$

where $L^{(g)}_{OB}(z)$ is a control law for the g-th cluster 30, corresponding to the deadbeat noise power 72.

Figure 7:
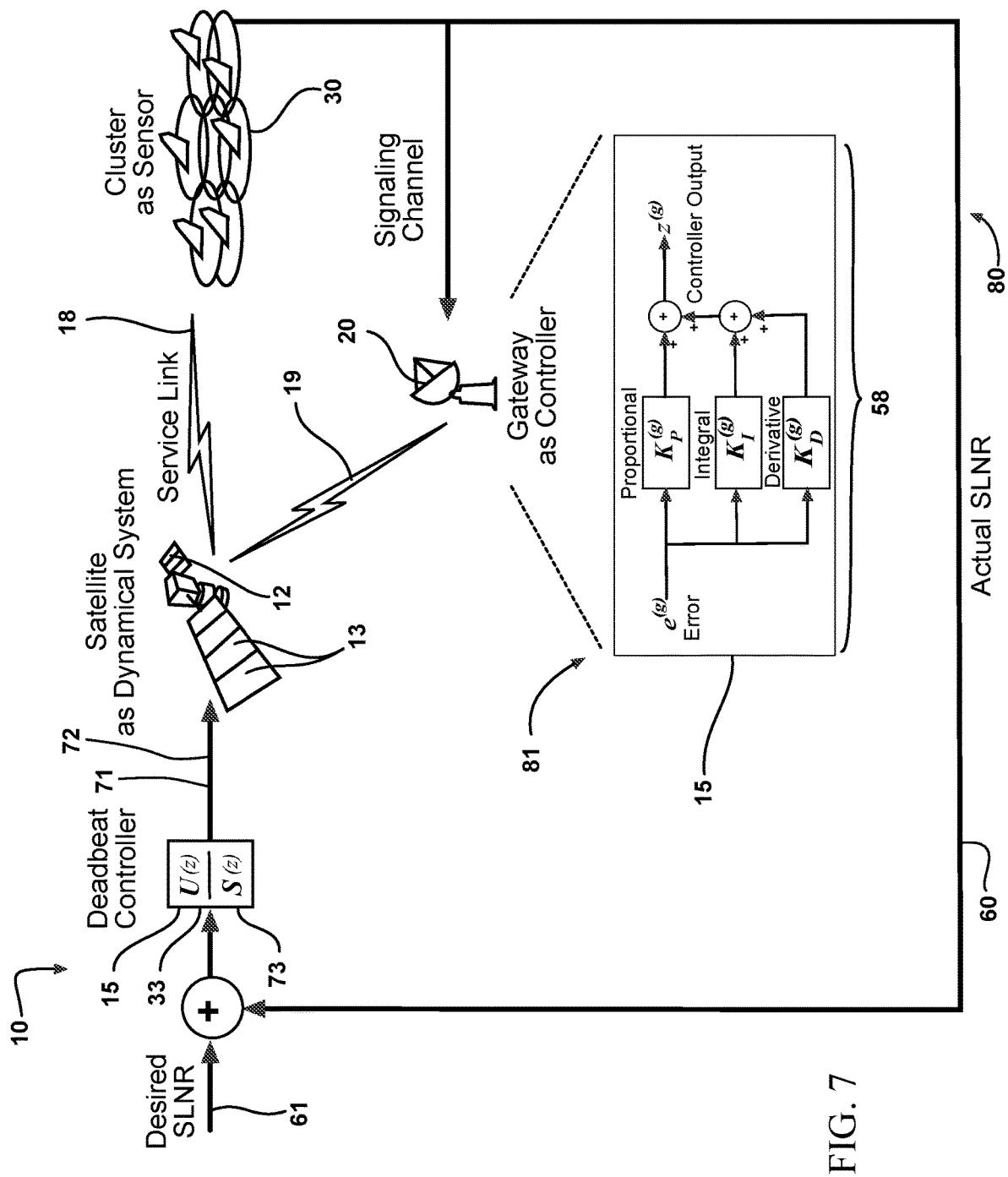
FIG. 7 is a schematic illustration of a hybrid ground—onboard precoding system for multi-gateway, multi-beam satellite communication.
Figure 8:
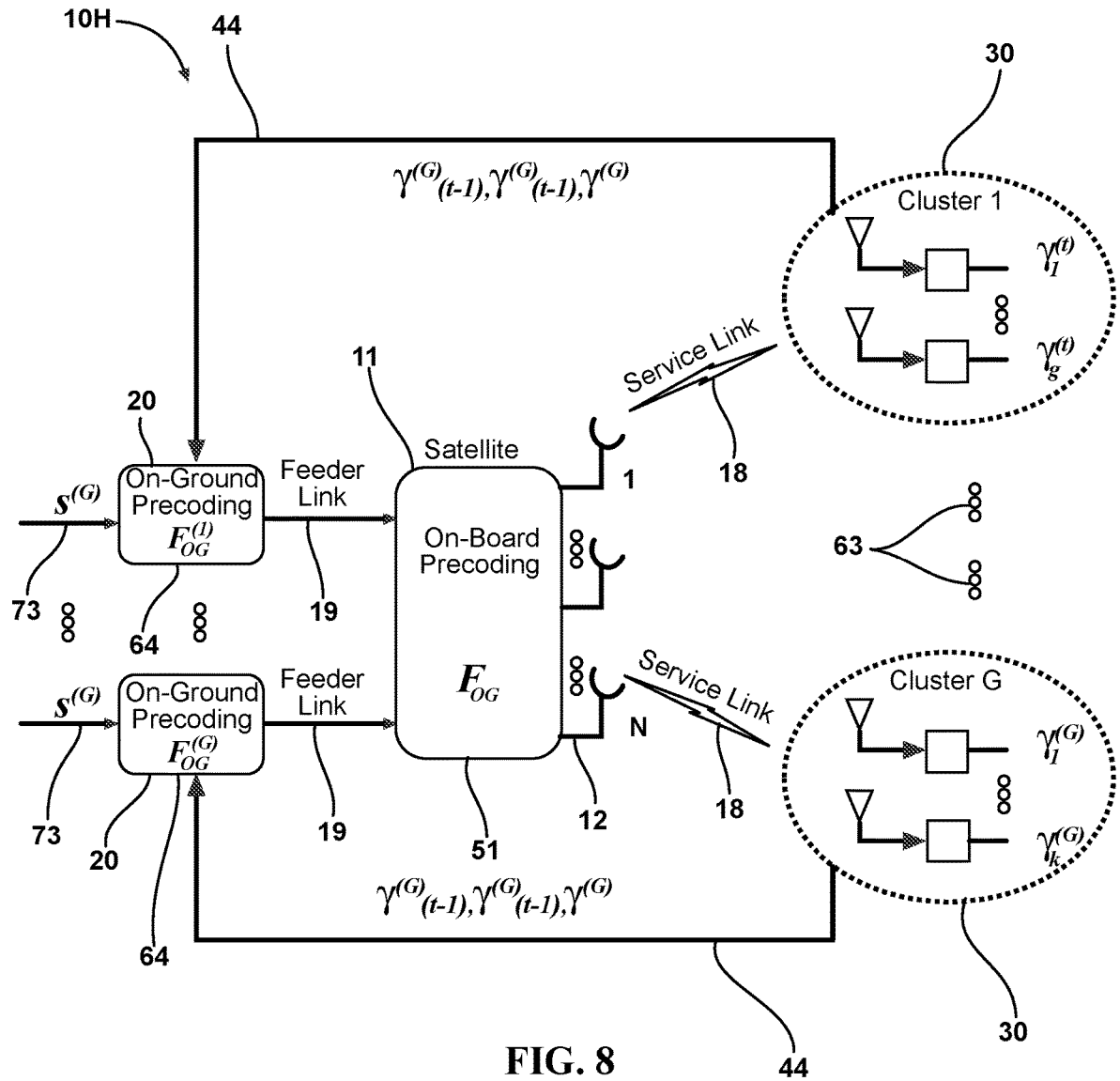
FIG. 8 is a schematic illustration of a hybrid ground—onboard precoding system for multi-gateway, multi-beam satellite communication with feedback signaling.

Referring to FIG. 7 and FIG. 8, in a third embodiment a hybrid system 10H may be used. This embodiment is structured hierarchically for coarse (outer-loop control 80) for onboard precoding and fine (inner-loop control 81) on ground precoding. At epoch t, the g-th gateway 20 is updated with the delayed feedback information about one or more of $\gamma^{(g)}(t-1)$, $I^{(g)}(t-1)$, and $T^{(g)}$ where $\gamma^{(g)}(t-1)$ is the actual SINR 44 at epoch t-1 for the g-th gateway 20, $I^{(g)}(t-1)$ is the interference temperature 41 at epoch t-1 for the g-th gateway 20 and $T^{(g)}$ is the maximum interference power tolerance 42 for the g-th gateway 20. Here, transmission delay of feedback information may be assumed one epoch unit time for simplicity. Epoch unit time delay, on the other hand, is required for estimation and delivery to the gateway 20 via return service links 18.

While, in one embodiment, the invention has been described as a method for precoding, the invention is not so limited. In another embodiment the invention comprises a non-transitory computer readable medium suitable for and configured to carry out computations and determinations of any of the foregoing, including only as limited by the claims below, algorithms, calculations, estimates such as but not limited to Kalman estimates, iterative/recursive exercises, solving of equations/inequalities and determinations of any of the parameters listed in the claims below.

The disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computer, netbook computer), microprocessor-based or programmable consumer or industrial electronics, and the like. The illustrated aspects may be practiced in distributed computing environments where tasks are performed by remote processing devices linked through a communications network. In a distributed computing environment, program modules can be located in both local and remote memory storage devices.

Exemplary non-transitory computer readable media are physical, transferable, reproducible, may comprise all computer readable media except for a transitory propagating signal and particularly include flash drives, magnetic strips, optical drives, CDs, DVDs, internal/external hard drives, more particularly internal/external solid state hard drives, and further exclude RAM, volatile memory requiring power for data storage, signals and effervescent carrier waves. In an alternative embodiment, transitory computer readable media may also be used.

Terms such as "store," "storage," "data store," data storage," "database," and substantially any other information storage component relevant to operation and functionality of a component, refer to "memory components," or entities embodied in a "memory" or components comprising the memory. By way of non-limiting illustration, and not limitation, volatile memory, non-volatile memory, disk storage, and memory storage. Further, non-transitory memory can be included in read only memory (ROM), programmable ROM (PROM), electrically programmable ROM (EPROM), electrically erasable ROM (EEPROM), or flash memory. Transitory memory can comprise random access memory (RAM), which acts as external cache memory. By way of non-limiting illustration, RAM is available as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a signal processor or a block of random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings. While the invention has been described and illustrated in the description and drawings, the same is to be considered as illustrative and not restrictive in character. The invention is limited only by the appended claims and all equivalents thereof.

What is claimed is:

1. A multi-gateway multi-beam satellite communication system comprising:
   a satellite having an array fed reflector antenna with a plurality of N elements;
   a first integer plurality of G gateways for providing broadband services to users and being in bilateral communication with said satellite by a like plurality of G feeder links;
   a second integer plurality of K clusters of coverage areas in bilateral communication with said satellite by a like integer plurality K of service links, wherein N>K;
   a precoding controller for comparing an actual Signal-to-interference-plus-noise (SINR) to a desired SINR setpoint, and comparing a signal power at a g-th cluster to a set of powers leaked from neighboring clusters of coverage areas, whereby at epoch t an interference temperature is determined such that said interference temperature is less than or equal to a maximum interference power tolerance for said system according to: $T^{(c)} \geq I^{(c)}(t)$, wherein $I^{(c)}(t)$ is an interference temperature and T (c) is a maximum interference power tolerance.

2. A system according to claim 1 wherein the interference temperature is given by:

$$I^{(c)}(t) = \sum_{i=1}^{G} \|H^{(i)}_c(t) F^{(i)}_{OG}(t)\|^2_F$$

and $H^{(i)}_c(t)$ denotes the channel sub-matrix corresponding to the effect of i feeds to the c-th cluster at epoch t and $F^{(i)}_{OG}(t)$ denotes the block linear precoding matrix of the g-th cluster at epoch t.

3. A system according to claim 2 wherein said controller utilizes discrete time implementation to determine a difference between said precoding matrix at $F^{(g)}_{OG}(t)$ at epoch t and a precoding matrix at $F^{(g)}_{OG}(t+1)$ at epoch (t+1) for at least one said gateway in order to determine a SINR tracking error designated as $e^{(g)}_{OG}$ for a g-th cluster.

4. A system according to claim 3 wherein intercluster interference $\Theta(t)$ at epoch t is greater than 1 and given by:

$$\Theta(t) \geq 1 \text{ where } \Theta(t) = T_{min}/(I_{max}(t-1); T_{min} = \min_{g=1,\ldots,G} T^{(g)} \text{ and } I_{max}(t-1) = \max_{g=1,\ldots,G} I^{(g)}(t-1).$$

5. A system according to claim 4 wherein said controller uses proportional, integral, derivative (PID) control to determine an increment $z^{(g)}(t)$ at epoch t to push or pull the actual SINR $\gamma^{(g)}$ closer to the desired SINR $\Gamma^{(g)}$ is given by:

$$z^{(g)}(t) = K^{(g)}_P e^{(g)}_{OG}(t-1) + K^{(g)}_I x^{(g)}(t-1) + K^{(g)}_D [e^{(g)}_{OG}(t-1) - e^{(g)}_{OG}(t-2)],$$

wherein $K^{(g)}_P$, $K^{(g)}_I$ and $L^{(g)}_D$ are the degrees of freedom for proportional, integral, and derivative control actions, respectively.

6. A multi-gateway multi-beam satellite communication system comprising:
a satellite having an array fed reflector antenna with an integer plurality of N elements;
a first integer plurality of G gateways for providing broadband services to users and being in bilateral communication with said satellite by a like plurality of G feeder links;
a second integer plurality of K clusters of coverage areas in bilateral communication with said satellite by a like plurality K of service links, wherein N>K;
an on ground precoding controller for comparing an actual SINR to a desired SINR setpoint, and comparing a dynamic feedback signal of a power level at a g-th cluster to a set of powers leaked from neighboring clusters of coverage areas, whereby at epoch t an interference temperature is determined such that said interference temperature is less than or equal to a maximum interference power tolerance for said system according to: $T^{(c)} \geq I^{(c)}(t)$, wherein $I^{(c)}(t)$ is an interference temperature and $T^{(c)}$ is a maximum interference power tolerance.

7. A system according to claim 6 wherein said controller determines a QoS of data transmission to or from a respective gateway g according to: $\eta^{(g)}(t) = \Gamma^{(g)}/(\gamma^{(g)}(t-1))$, where $\eta^{(g)}(t)$ is a measure of the quality of service (QoS) at epoch t, $\Gamma^{(g)}$ is a desired SINR and $\gamma^{(g)}$ is an actual SINR.

8. A system according to claim 7 wherein said controller increases an on ground precoding transmission power Tr for gateway g if $\eta^{(g)}(t) > 1$.

9. A system according to claim 6 wherein said controller determines intercluster interference according to $\Theta(t) = T_{min}/(I_{max}(t-1), T_{min} = \min_{g=1,\ldots,G} T^{(g)}$ and $I_{max}(t-1) = \max_{g=1,\ldots,G} I^{(g)}(t-1)$.

10. A system according to claim 9 wherein a g-th gateway increases a respective transmission power Tr if $\Theta(t) \geq 1$.

11. A system according to claim 10 wherein said g-th gateway increases said transmission power Tr if Tr if $\Theta(t) \geq 1$ or if $\eta^{(g)}(t) > 1$, wherein $\eta^{(g)}(t)$ is a measure of the quality of service (QoS) at epoch t.

12. A system according to claim 10 wherein said g-th gateway increases said transmission power only if Tr if $\Theta(t) \geq 1$ and if $\eta^{(g)}(t) > 1$, wherein $\eta^{(g)}(t)$ is a measure of the quality of service (QoS) at epoch t.z.

13. A system according to claim 9 wherein said g-th gateway increases said respective transmission power from $\text{Tr}\{F^{(g)}_{(OG)}(t-1) F^{(g)}_{(OG)}{}^H(t-1)\}$ to $\Theta(t)\text{Tr}\{F^{(g)}_{(OG)}(t-1)(F^{(g)}_{(OG)}{}^H(t-1))\}$ for $g=1,\ldots,G$, and $F^{(g)}_{OG}(t)$ denotes the block linear precoding matrix of the g-th cluster at epoch t and $\text{Tr}\{F^{(g)}_{OG}(t)(F^{(g)}_{OG})^H(t)\}$ is the total transmit power of on ground precoding for the g-th cluster.

14. A multi-gateway multi-beam satellite communication system comprising:
a satellite having an array fed reflector antenna with an integer plurality of N elements and an onboard precoding controller;
a first integer plurality of G gateways for providing broadband services to users and being in bilateral communication with said satellite by a like plurality of G feeder links; and
a second integer plurality of K clusters of coverage areas in bilateral communication with said satellite by a like plurality K of service links, wherein N>K;
said onboard precoding controller comparing an actual Signal-to-interference-plus-noise kSINR) to a desired SINR setpoint, and comparing a signal power at a g-th cluster to a set of powers leaked from neighboring clusters of coverage areas, whereby at epoch t an interference temperature is determined such that said interference temperature is less than or equal to a maximum interference power tolerance for said system according to: $T^{(c)} \geq I^{(c)}(t)$, wherein $I^{(c)}(t)$ is an interference temperature and $T^{(c)}$ is a maximum interference power tolerance.

15. A system according to claim 14 wherein said controller determines an incremental power update amount $p^{(g)}$ for onboard precoding according to: $p^{(g)}(t+1) = p^{(g)}(t) + u^{(g)}_{OB}(t)$ where $u^{(g)}_{OB}$ is the difference at the g-th gateway transmission between the precoding matrix $F^{(g)}_{OG}(t)$ at epoch t and the precoding matrix $F^{(g)}_{OG}(t+1)$ at epoch t+1.

16. A system according to claim 15 wherein said controller determines a deadbeat response according to: $K^{(g)}_{OB}(z) = -1/(1 + z^{-1} + z^{-2} \ldots z^{D-1})$ wherein $K^{(g)}_{OB}(z)$ is a deadbeat control law for a g-th cluster and D is a delay, which is a multiplicity of epoch unit times for onboard precoding updates for a plurality of downlink service paths.

17. A system according to claim 16 wherein a power update for on board precoding in the g-th cluster is determined by a linear dynamic state variable.

18. A hybrid system according to claim 15 having both said onboard satellite controller for precoding a plurality of service links to a like plurality of said clusters and an on ground controller for precoding a plurality of feeder links from said plurality of gateways to said satellite.

19. A hybrid system according to claim 18 having a coarse outer-loop control for said onground precoding and fine inner-loop control for said on board precoding.

20. A hybrid system according to claim 19 wherein at epoch t, the g-th gateway is updated with the delayed feedback information about $\gamma^{(g)}(t-1)$, $I^{(g)}(t-1)$, and $T^{(g)}$, wherein $\gamma^{(g)}(t-1)$ is an actual SINR for gateway g at epoch t-1, $I^{(g)}(t-1)$ is an actual intercluster interference for gateway g at epoch t-1 and $T^{(g)}$ is an actual noise temperature for gateway g.

* * * * *